Feb. 18, 1958     H. L. POTTER     2,823,449
METHOD OF MAKING A BALL BEARING
Filed April 13, 1953
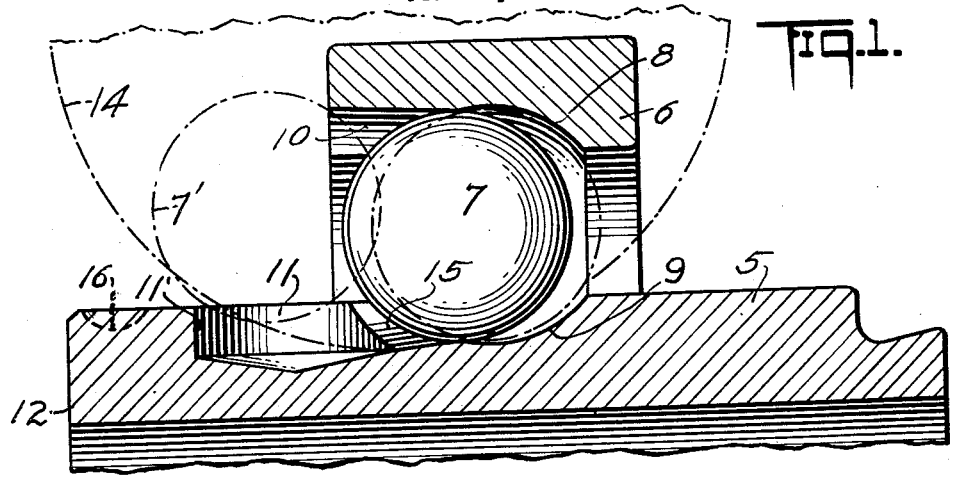
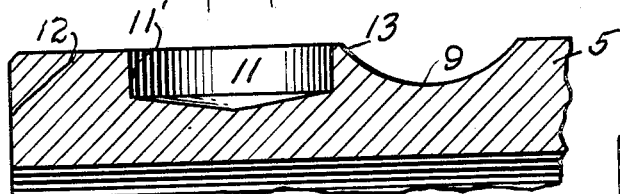
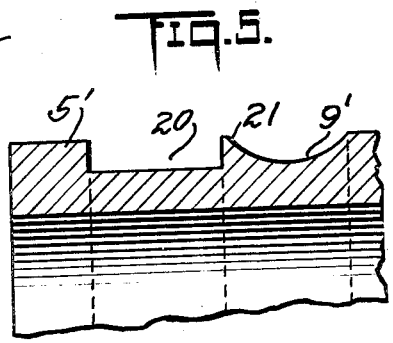
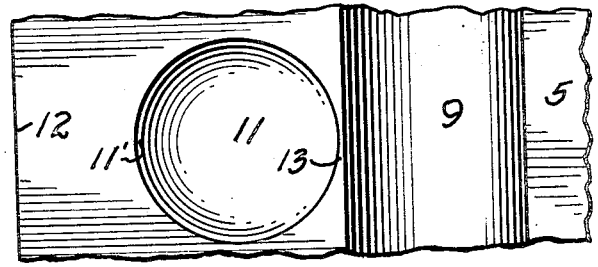
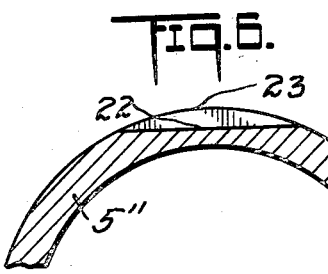
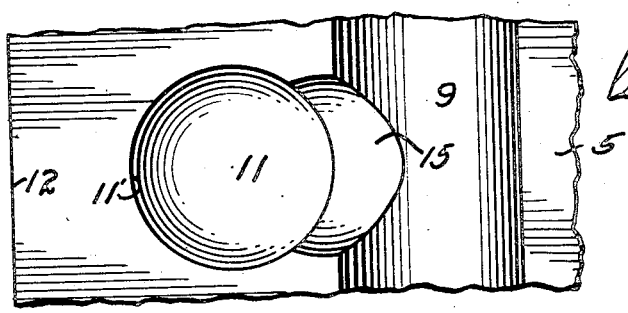
INVENTOR
Howell L. Potter
BY
Mitchell Bechert
ATTORNEYS 2,823,449
Patented Feb. 18, 1958

United States Patent Office

2,823,449
METHOD OF MAKING A BALL BEARING

Howell L. Potter, New Britain, Conn., assignor to The Fafnir Bearing Company, New Britain, Conn., a corporation of Connecticut Application April 13, 1953, Serial No. 348,299

6 Claims. (Cl. 29—148.4)

My invention relates to antifriction bearings, and in particular to a method of forming filler slots in race-ring constructions therefor. This application is a continuation-in-part of my application Series No. 72,346 filed January 24, 1949, now Patent No. 2,643,165.

In antifriction bearings in which the race grooves are defined by opposed generally radially extending walls, it is customary to provide filler slots in one or both of the race rings in order to permit assembly of the antifriction elements between the race rings. In the case of inner rings for such bearings, two methods and constructions for such slots have generally been used. In accordance with one construction, the filler slot is milled from the race groove and generally longitudinally out to the adjacent end of the bearing ring, but such construction provides a discontinuous outer surface on the inner ring so as to render unfeasible the relatively inexpensive grinding of the ring on a centerless grinder; this construction also renders unfeasible the application of a seal to run on the slotted side of the bearing ring. In accordance with the other construction, the outer surface of one end of the inner ring is turned down to a diameter slightly less than the diameter of the bottom of the race groove, and this turned down end extends from the edge of the race groove to the end of the ring. An axial filler slot is then cut in the barrier between this turned down end and the race groove. Even though this second method of construction may permit the application of a seal between the bearing rings, the outer turned down end of the inner ring is rendered unnecessarily weak and the turned down end is usually rough and unsatisfactory for receiving a contact seal.

It is, accordingly, an object of the invention to provide an improved method of forming a filler slot in a bearing ring.

It is another object to provide an improved method of forming an inner-bearing-ring construction wherein a filler slot may be provided for insertion of antifriction elements, said method involving the removal of a minimum of material after hardening.

Other objects and various further features of the invention will be pointed out or will occur to those skilled in the art from a reading of the following specification in conjunction with the accompanying drawings. In said drawings, which show, for illustrative purposes only, preferred methods:

Fig. 1 is a fragmentary sectional view through an antifriction bearing incorporating features of the invention, the parts being shown during an assembly operation;

Fig. 2 is a fragmentary sectional view of the inner ring of Fig. 1, during the process of making said inner ring;

Fig. 3 is a more or less plan view of the part of the inner ring which is shown in Fig. 2;

Fig. 4 is a view similar to Fig. 3, after a further step in the manufacture of the inner ring of Fig. 1; and Figs. 5 and 6 are sectional views similar to Fig. 2, illustrating modifications.

Briefly stated, my invention contemplates an improved filler-slot construction and method of making the same. The slot may be formed by providing a limited recess in the outer surface of the inner ring, said recess being located between the race groove and the adjacent end of the ring, and the ring may be cut away between the recess and the groove. In the methods to be described, the recess is provided by making a shallow bore, groove or flat in the outer surface of the ring and adjacent one side of the race groove. The ring material between the bore, groove or flat and the groove may then be cut away, as by a grinding operation, after hardening and after the race groove and the outer ring surface have been ground to the desired finish.

Referring to the drawings, my invention is shown in application to an antifriction bearing including an inner ring 5, an outer ring 6, and ball-type antifriction elements 7. The antifriction elements 7 may run in an outer race groove 8 and in an inner race groove 9 having lateral walls extending generally radially. Ball-insertion or filler slots, such as the slot 10 in the outer ring 6, may be ground or otherwise formed at one location on each ring.

In accordance with the invention, I provide a novel method of forming an insertion or filler slot means in the inner ring 5 so as not to greatly impair the strength of the inner ring and to permit ring grinding on a centerless grinder and so as also to permit the application of seal means between the race rings 5—6 on the insertion side of the bearing. Such insertion slot, in the form shown in Figs. 1 to 4, may include a limited recess 11 between the race groove 9 and one end 12 of the ring 5. This recess 11 may be simply formed as a shallow bore or hole extending generally radially and preferably near one lip or wall 13 of the race groove 9. The bore 11 may be made by a drill sharpened slightly flatter at the point than is conventional, and the drill may be run to a depth substantially the same as and preferably slightly below the race groove depth. This drilling operation may be effected before the ring 5 is subjected to hardening and, therefore, before the race groove is finish-ground; and, since the ring material between the bore 11 and the race groove 9 is to be cut away after hardening, I prefer that the amount of material then removed shall be a minimum. The bore 11 is thus preferably drilled as close as is tolerable to the wall 13 of the groove 9. The bore 11 may also be of such diameter or so longitudinally located that the outer end or lip 11' thereof may provide adequate clearance for the insertion of a ball, as indicated by the dot-dash outline 7' of a ball 7 in the process of insertion.

As has been implied above, the insertion or filler slot of the inner ring 5 may be completed by a grinding step to take place after hardening and after the race groove 9 and the outer surface of the ring 6 have been finish-ground. I have found that this final removal of slot material may be very effectively accomplished by a grinding wheel of relatively large radius, as indicated by the dot-dash outline 14 of Fig. 1. The wheel 14 may be spun on an axis generally at right angles to the axis of the ring 5, and there need be no chucking of the inner ring to accomplish this final grinding step. In practice, the inner ring is placed face down on a table and brought up against the grinding wheel 14, which is spun on a horizontal axis. Once this axis has been properly adjusted for spacing above the table, the slot cut is properly located; and, as grinding proceeds, the operator need merely oscillate the inner ring from side to side about the face of the wheel in order to generate the desired shape. Of course, the insertion slot may be made to enter upon the race groove 9 at any desired location by adjustment of the placement of the grinding wheel axis, but, in the preferred form shown, the recess or groove 15 cut away by the grinding wheel 14 terminates short of the point of maximum depth of the groove 9 so as to leave a very small barrier over which the balls are snapped and the groove 9 provides an uninterrupted raceway for the balls in the bottom thereof.

It will be clear that I have described an improved insertion or filler-slot construction and an improved method of forming the same. Since the slot does not run out to the face or end of the ring, there is an uninterrupted cylindrical surface on which a seal may be run; this could be a regular felt seal, a pressed or slinger-type seal, or the outer surface of the ring 5 could be grooved (as schematically indicated by dotted lines 16 in Fig. 1) for the accommodation of a resilient seal of the type described in the copending application of F. Leister et al., Serial No. 291,704 filed June 4, 1952, now Patent No. 2,764,432. Because of the above-mentioned uninterrupted cylindrical surface at the end 12, it is possible to grind the outer surface of the ring 5 on a centerless grinder after making the bore 11 (before hardening) and after hardening; by using a centerless grinder it will be appreciated that the cost may be reduced substantially since the present method requires mounting the inner ring on an arbor in a cylindrical grinder. Aside from the above-noted features of better adaptability to seals and of cheaper grinding, my improved construction makes possible considerable savings in machining, for the bore or hole 11 can be drilled more quickly than the conventional slot can be milled, and the drill can be easily resharpened so as to last for an indefinite time, whereas mills wear out relatively rapidly and are expensive and difficult to sharpen.

While the method described in connection with Figs. 1 to 4 is a preferred one, other methods or variations may be made.

In the form shown in Fig. 5, instead of drilling a radial hole or bore in the ring 5' having the raceway groove 9' like the four shown in Figs. 1 to 4, I turn or otherwise form a slot or groove 20 in the outer surface of the ring 5'. Such slot or groove 20 may be of about the same depth as the hole 11 and approach the groove 9' about as closely. The groove 20 is preferably turned in the ring when it is being machined but the groove 20 could be made otherwise and would not have to extend completely around the ring. The barrier 21 between the groove 20 and raceway 9' would be ground down as shown in Fig. 1 to provide the filler slot as illustrated and described in connection with Fig. 1.

In the form shown in Fig. 6, instead of the hole as in Fig. 1 or the groove as in Fig. 5, a flat 22 is milled or otherwise formed in the outer surface of the ring between the raceway and the adjacent end of the ring. Such a flat would function in much the same manner as the groove 20 and would leave a barrier 23 corresponding to the barrier 21 of Fig. 5. The barrier 23 could be ground down as heretofore described to form a filler slot.

While I have described my invention in detail for the preferred methods and forms shown, it will be understood that modifications may be made within the scope of the invention as defined in the appended claims.

I claim:

1. The method of making an inner bearing ring of the character indicated from a cylindrical annular ring blank, which comprises forming a circumferential race groove between the ends of said ring, boring said ring between the race groove and one end of said ring, hardening said ring, finish-grinding the race groove, and grinding away a passage between the bore and the race groove.

2. The method of forming a filler slot in a bearing ring having a raceway groove therein, which comprises, forming a generally radial depression in the ring near the raceway groove and spaced from the adjacent end of the bearing ring so as to leave a relatively thin barrier between the depression and the raceway groove, finish-grinding said race groove, and cutting the barrier to form a filler slot from said depression to said groove.

3. The method of forming a filler slot in a bearing ring having a raceway groove therein which comprises forming a generally radial depression in said ring adjacent the raceway groove and terminating substantially short of the adjacent end of the ring, and cutting the barrier between said raceway groove and the depression to form the filler slot.

4. In the combination defined in claim 3, the step of forming a generally radial depression, comprising drilling a generally radial hole in said ring.

5. In the combination defined in claim 3, the step of forming a generally radial depression, comprising turning a circumferential groove in said ring.

6. In the combination defined in claim 3, the step of forming a generally radial depression, comprising slabbing off a flat on said ring.

References Cited in the file of this patent

UNITED STATES PATENTS

| | | |
|---|---|---|
| 818,734 | Blin | Apr. 24, 1906 |
| 1,027,542 | Hess | May 28, 1912 |
| 1,051,625 | Oldfield | Jan. 28, 1913 |
| 1,165,992 | Marreck | Dec. 28, 1915 |
| 1,269,808 | Gray | June 18, 1918 |
| 1,854,897 | Ganster | Apr. 19, 1932 |
| 2,243,464 | Kucher | May 27, 1941 |
| 2,466,123 | Osplack | Apr. 5, 1949 |